(12) United States Patent
Sundaram et al.

(10) Patent No.: US 11,395,047 B2
(45) Date of Patent: *Jul. 19, 2022

(54) SYSTEM AND METHOD FOR AUTHENTICATION AND LOGIN PORTABILITY FOR MULTISCREEN DISCOVERY AND LAUNCH OF FIRST SCREEN CONTENT

(71) Applicant: ARRIS Enterprises LLC, Suwanee, GA (US)

(72) Inventors: Sudha Sundaram, Bangalore (IN); Anil Nainwal, Bangalore (IN); Vinod Jatti, Bangalore (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,057

(22) Filed: Sep. 14, 2020

(65) Prior Publication Data

US 2021/0067838 A1 Mar. 4, 2021

Related U.S. Application Data

(63) Continuation of application No. 16/228,713, filed on Dec. 20, 2018, now Pat. No. 10,779,054.

(51) Int. Cl.
*H04N 21/647* (2011.01)
*H04N 21/414* (2011.01)
(Continued)

(52) U.S. Cl.
CPC . *H04N 21/64784* (2013.01); *H04N 21/41265* (2020.08); *H04N 21/41407* (2013.01);
(Continued)

(58) Field of Classification Search
CPC ........... H04N 21/64784; H04N 21/436; H04N 21/4753; H04N 21/41407
See application file for complete search history.

(56) References Cited

U.S. PATENT DOCUMENTS 9,736,541 B1 * 8/2017 Nijim ................. H04N 21/8146
2014/0006474 A1 * 1/2014 White ..................... H04L 67/16
709/201

(Continued)

FOREIGN PATENT DOCUMENTS

EP 2 797 329 10/2014
EP 3 190 786 7/2017

OTHER PUBLICATIONS

International Search Report dated Mar. 3, 2020 in International (PCT) Application No. PCT/US2019/067908.

(Continued)

*Primary Examiner* — Yassin Alata
(74) *Attorney, Agent, or Firm* — Wenderoth, Lind & Ponack, L.L.P.

(57) ABSTRACT

A device including a communication component, a DIAL protocol component, a video processing component and a PIC verification component. The communication component can wirelessly receive a personal identification code, can communicate with a display and can receive first video content from a content provider. The DIAL protocol component can perform protocols in accordance with a multiscreen discovery and launch of first screen content specification. The video processing component can provide first video data including PIC image data corresponding to a code so as to display the first video data and a PIC image on the display. The PIC verification component can generate a verification signal when the personal identification code corresponds to the PIC image data. The video processing component can further provide the first video content to the display based on the verification signal.

18 Claims, 13 Drawing Sheets

(51) Int. Cl.
*H04N 21/436* (2011.01)
*H04N 21/475* (2011.01)
*H04N 21/41* (2011.01)
*H04N 21/43* (2011.01)

(52) U.S. Cl.
CPC ..... *H04N 21/436* (2013.01); *H04N 21/43078* (2020.08); *H04N 21/4753* (2013.01)

(56) References Cited

U.S. PATENT DOCUMENTS

| | | | |
|---|---|---|---|
| 2015/0244807 A1* | 8/2015 | Shoemake | H04L 67/125 709/202 |
| 2016/0205429 A1* | 7/2016 | Ortiz | H04N 21/482 725/25 |

OTHER PUBLICATIONS

Disclaimed Anonymous, "DIAL—Discovery and Launch protocol specification—Version 2.2", Oct. 28, 2018, XP 055670153, URL: http://www.dial-multiscreen.org/dial-protocol-specification/DIAL-2ndScreenProtocol%2C%20v2.2.pdf.
Netflix, Inc., "DIAL: Discovery and Launch protocol specification: Version 2.2" (Oct. 28, 2018).
International Preliminary Report on Patentability and Written Opinion of the International Searching Authority dated Jun. 16, 2021 in International (PCT) Application No. PCT/US2019/067908.

* cited by examiner

SYSTEM AND METHOD FOR AUTHENTICATION AND LOGIN PORTABILITY FOR MULTISCREEN DISCOVERY AND LAUNCH OF FIRST SCREEN CONTENT

BACKGROUND

Embodiments of the invention relate to devices and methods that use the Discovery and Launch (DIAL) protocol.

There exists a need for a system and method for preventing an override of a previously launched DIAL protocol.

SUMMARY

Aspects of certain embodiments of the present invention are drawn to a system and method for preventing an override of a previously launched DIAL protocol.

An aspect of an embodiment of the present invention is drawn to a device for use with a content provider, a first portable device, a second portable device, a remote control and a display. The content provider can provide first video content and second video content. The first portable device can receive the first video content from the content provider. At least one of the first portable device and the remote control can provide a personal identification code (PIC). The second portable device can receive the second video content. The display can display the first video content and the second video content. The device includes a communication component, a DIAL protocol component, a video processing component and a PIC verification component. The communication component can wirelessly receive the PIC, can communicate with the display and can receive the first video content from the content provider. The DIAL protocol component can perform protocols in accordance with a multiscreen discovery and launch of first screen content specification. The video processing component can provide first video data including PIC image data corresponding to a code so as to display the first video data and a PIC image on the display. The PIC verification component can generate a verification signal when the PIC corresponds to the PIC image data. The video processing component can further provide the first video content to the display based on the verification signal.

BRIEF SUMMARY OF THE DRAWINGS

The accompanying drawings, which are incorporated in and form a part of the specification, illustrate example embodiments and, together with the description, serve to explain the principles of the invention. In the drawings:

FIGS. 2A-2D illustrate the operation of a set-top box (STB) of the prior art DIAL system of FIG. 1, wherein FIG. 2A illustrates operation at a first time, $t_1$, FIG. 2B illustrates operation at a second time, $t_2$, FIG. 2C illustrates operation at a third time, $t_3$, and FIG. 2D illustrates operation at a fourth time, $t_4$.

FIGS. 7A-7D illustrate the operation of the STB of the example DIAL system of FIG. 5 for displaying content in accordance with aspects of an embodiment, wherein FIG. 7A illustrates operation at a first time, $t_a$, FIG. 7B illustrates operation at a second time, $t_b$, FIG. 7C illustrates operation at a third time, $t_c$, and FIG. 7D illustrates operation at a fourth time, a FIG. 8 illustrates an example method for displaying content from a content provider that requires a login identification code in accordance with aspects of an embodiment.

FIGS. 9A-9C illustrate the operation of the STB of the example DIAL system of FIG. 5 for displaying content from a content provider that requires a login identification code in accordance with aspects of an embodiment, wherein FIG. 9A illustrates operation at a first time, $t_a$, FIG. 9B illustrates operation at a second time, $t_b$, and FIG. 9C illustrates operation at a third time, $t_c$.

FIGS. 12A-12C illustrate the operation of the STB of the example DIAL system of FIG. 5 for preventing interruption of content or displaying new content in accordance with aspects of an embodiment, wherein FIG. 12A illustrates operation at a first time, $t_a$, FIG. 12B illustrates operation at a second time, $t_b$, and FIG. 12C illustrates potential operation at a third time, $t_c$.

DETAILED DESCRIPTION

Figure 1:
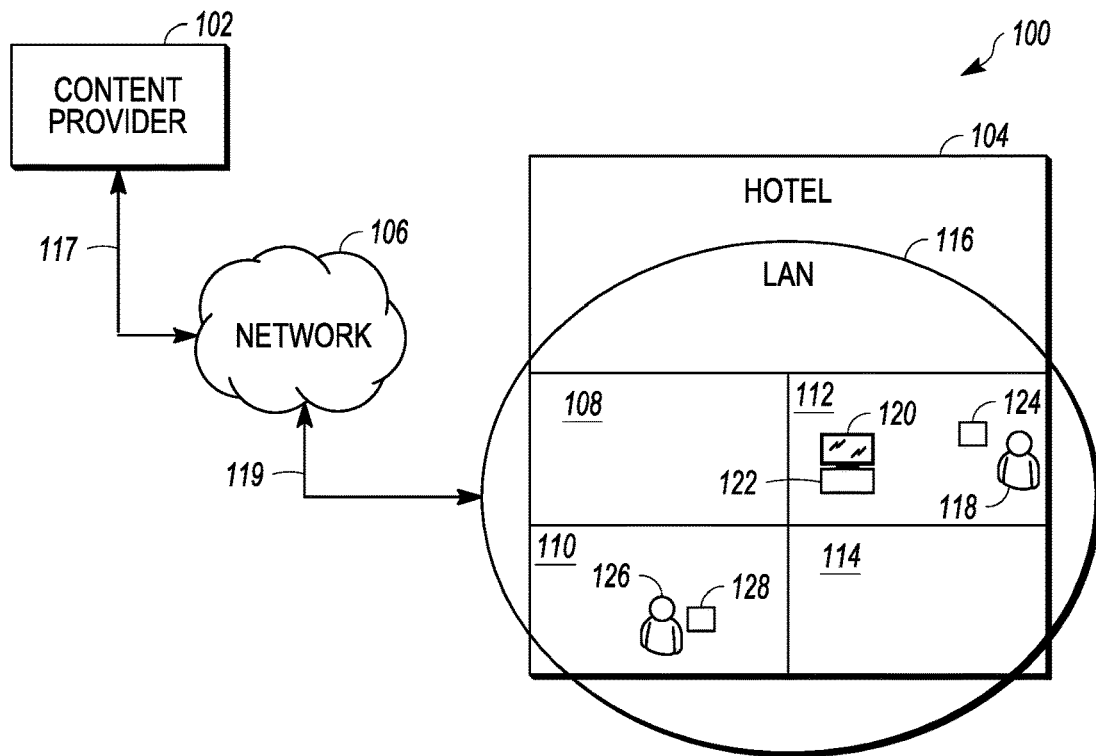
FIG. 1 illustrates a prior art DIAL system.

FIG. 1 illustrates a prior art DIAL system 100.

As shown in FIG. 1, prior art DIAL system 100 includes a content provider 102, a hotel 104 and a network 106. Hotel 104 includes rooms 108, 110, 112 and 114 and a local area network (LAN) 116. Room 112 includes a person 118, a television 120, a STB 122 and a portable device 124. Room 110 includes a person 126 and a portable device 128.

Content provider 102 is arranged to communicate with network 106 via a communication channel 117. Hotel 104 is arranged to communicate with network 106 via a communication channel 119.

Content provider 102 may be any device or system that is operable to provide audio, video and/or audio/video (AV) content to clients by way of network 106. A non-limiting example of content provider 102 includes a headend cable television provider.

LAN 116 may be any network that is able to interconnect portable devices and STBs within hotel 104 and to connect portable devices and STBs within hotel 104 to network 106. Non-limiting examples of LAN 116 include Ethernet and Wi-Fi.

LAN 116 generally employs a layered protocol (e.g., makes use of what are sometimes called protocol stacks or layered protocols (e.g., the Open Systems Interconnection (OSI)model). Networks generally employ such layered network protocols to accommodate a vast diversity of systems and physical devices (e.g., diverse platforms, such as computers running various operating systems, smart phones, entertainment systems, etc., and diverse forms of physical connection, such as various types of wired connections, wireless connections, fiber optics, etc.). In a layered protocol, each layer is responsible for a particular kind of functionality, and each layer depends on the layers below it for other functions and provides services to the layers above it. In accordance with such a layered system, a given service can be used by multiple versions of the layer above it, and can make use of multiple versions of the layer below it. For example, in view of current large and complex systems that are constantly being updated, the layered protocol provides for the ability to change the implementation of a service without affecting other components of the system, and also different services can be implemented at each layer and can be modified or replaced without affecting the services of the other layers.

The OSI model includes seven independent protocol layers: (1) Layer 1, the physical layer, which defines electrical and physical specifications for devices, and the relationship between a device and a transmission medium, such as a copper or fiber optical cable; (2) Layer 2, the data link layer, which provides the functional and procedural means for the transfer of data between network entities and the detection and correction of errors that may occur in the physical layer; (3) Layer 3, the network layer, which provides the functional and procedural means for transferring variable length data sequences from a source host on one network to a destination host on a different network (in contrast to the data link layer which connects hosts within the same network), and performs network routing functions and sometimes fragmentation and reassembly; (4) Layer 4, the transport layer, which provides transparent transfer of data between end users, providing reliable data transfer services to the upper layers by controlling the reliability of a given link through flow control, segmentation/desegmentation, and error control; (5) Layer 5, the session layer, which controls the connections (interchanges) between computers, establishing, managing and terminating the connections between the local and remote applications; (6) Layer 6, the presentation layer, which establishes context between application layer entities, by which the higher-layer entities may use different syntax and semantics when the presentation service provides a mapping between them; and (7) Layer 7, the application layer, which interacts directly with the software applications that implement the communicating component.

Generic Stream Encapsulation (GSE) provides a data link layer protocol, which facilitates the transmission of data from packet oriented protocols (e.g., Internet protocol or IP) on top of a unidirectional physical layer protocol (e.g., DVB-S2, DVB-T2 and DVB-C2). GSE provides functions/characteristics, such as support for multi-protocol encapsulation (e.g., IPv4, IPv6, MPEG, ATM, Ethernet, VLANs, etc.), transparency to network layer functions (e.g., IP encryption and IP header compression), and support of several addressing modes, a mechanism for fragmenting IP datagrams or other network layer packets over baseband frames, and support for hardware and software filtering.

In a layered system, a unit of data that is specified in a protocol of a given layer (e.g., a "packet" at the network layer), and which includes protocol-control information and possibly user data of that layer, is commonly referred to as a "protocol data unit" or PDU. At the Network Layer, data is formatted into data packets (e.g., IP datagrams, Ethernet Frames, or other network layer packets).

Television 120 is but one example of a display that may be operable to display the video content that is provided by content provider 102.

STB 122 is an information appliance device that generally contains a television-tuner input and displays output to a television set and an external source of signal, turning the source signal into content in a form that then be displayed on the television screen or other display device. They are used in cable television, satellite television, and over-the-air television systems, as well as other uses. STB 122 may be any device or system that is operable to communicate with content provider 102, receive content from content provider 102 and provide the content to television 120.

When communicating with content provider 102 by way of external network 106, STB 122 may perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Each of portable devices 124 and 128 is a small form factor of a computing device that is designed to be held and used in the hands. Portable devices 124 and 128 may be any device or system that is operable to receive video content from content provider 102. Non-limiting examples of portable devices 124 and 128 include laptop computers, tablets and smartphones.

Figure 2A:
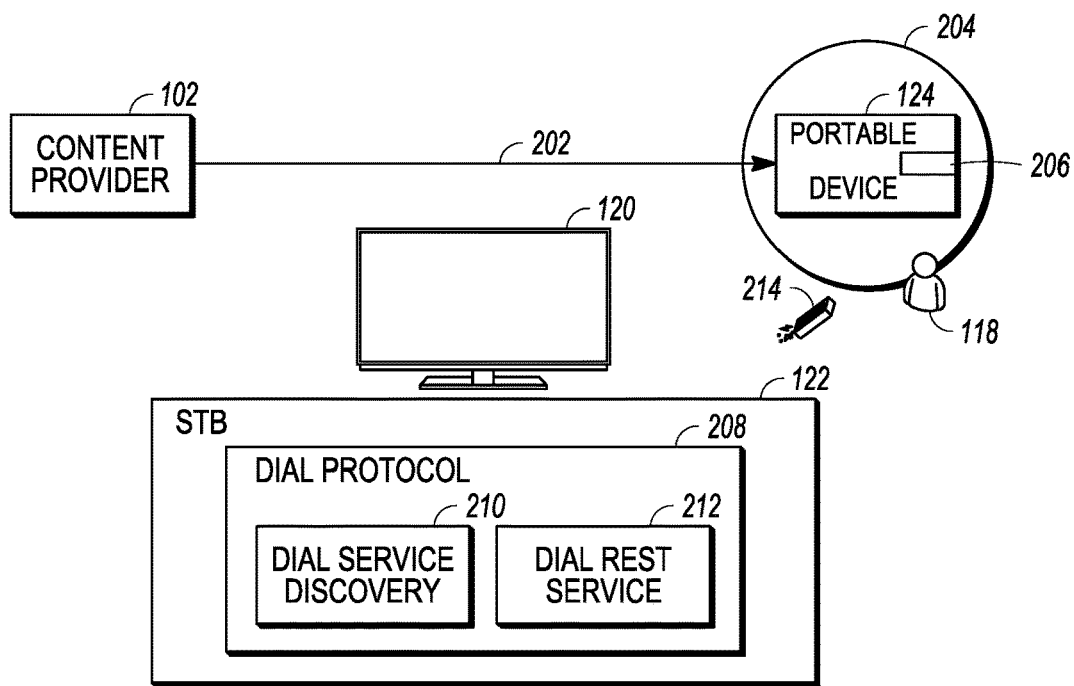
Figure 2B:
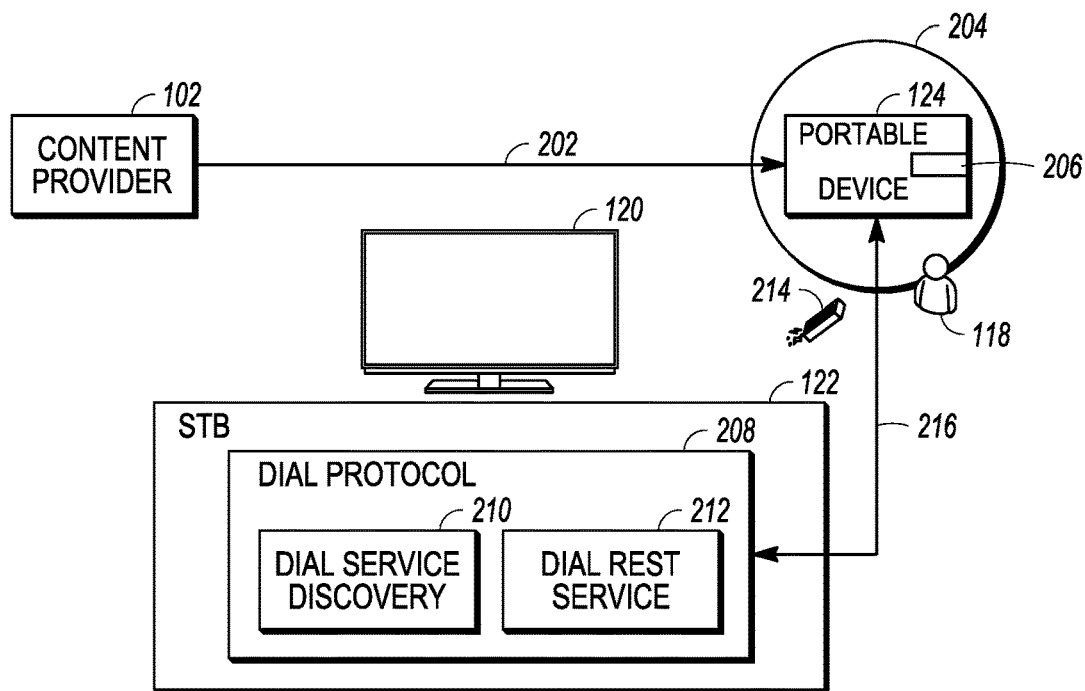
Figure 2C:
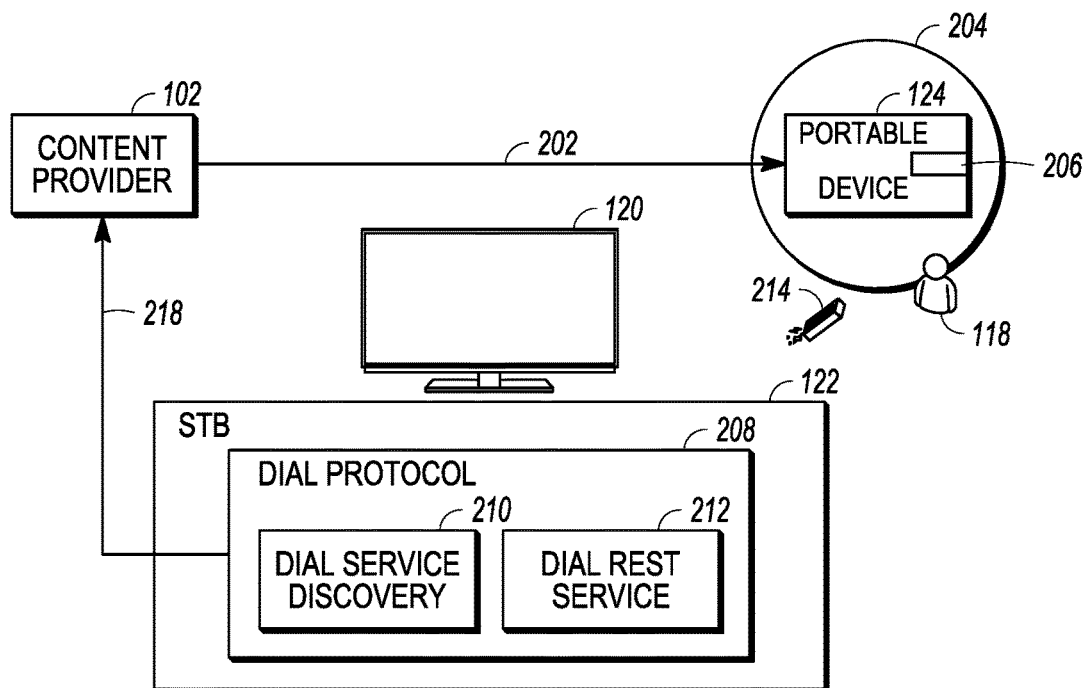
Figure 2D:
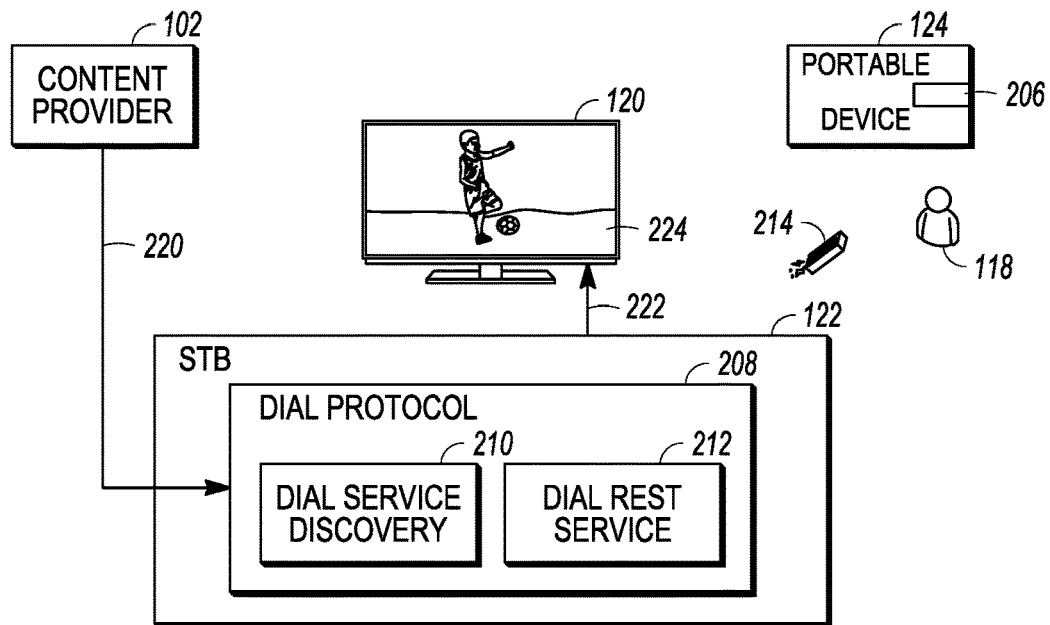

FIGS. 2A-2D illustrate the operation of STB 122 of prior art DIAL system 100, wherein FIG. 2A illustrates operation at a first time, $t_1$, FIG. 2B illustrates operation at a second time, $t_2$, FIG. 2C illustrates operation at a third time, $t_3$, and FIG. 2D illustrates operation at a fourth time, $t_4$.

FIG. 2A includes content provider 102, user 118, STB 122, television 120, portable device 124 and a remote control 214. Portable device 124 includes a client DIAL protocol component 206. STB 122 includes a server DIAL protocol component 208. Server DIAL protocol component 208 includes a DIAL service discovery component 210 and a DIAL REST service component 212.

Remote control 214 may be any device or system that is able to accept user input to remotely control television 120 and STB 122.

In this example, DIAL service discovery component 210 and DIAL REST service component 212 are illustrated as individual devices. However, in some embodiments, DIAL service discovery component 210 and DIAL REST service component 212 may be combined as a unitary device. Further, in some embodiments, at least one of DIAL service discovery component 210 and DIAL REST service component 212 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to, the tangible computer-readable media. In the alternative, the tangible computer-readable media may be integral to the processor. The processor and the tangible computer-readable media may reside in an application-specific integrated circuit (ASIC). In the alternative, the processor and the tangible computer-readable media may reside as discrete components.

Non-limiting example systems include a computer system/server, which is operational with numerous other general purpose or special purpose computing system environments or configurations. Examples of well-known computing systems, environments, and/or configurations that may be suitable for use with the computer system/server include, but are not limited to, personal computer systems, server computer systems, thin clients, thick clients, handheld or laptop devices, multiprocessor systems, microprocessor-based systems, STBs, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating systems, one or more application programs, other program modules, and program data or some combination thereof, may include an implementation of a networking environment. The program modules generally carry out the functions and/or methodologies of various embodiments of the application as described herein.

Client DIAL protocol component 206 may be any device or system that is operable to perform client side protocols in accordance with a multiscreen DIAL of first screen content specification.

DIAL is a protocol co-developed by Netflix and YouTube with help from Sony and Samsung. It is a mechanism for discovering and launching applications on a single subnet, typically a home network. It relies on Universal Plug and Play (UPnP), Simple Service Discovery Protocol (SSDP), and HTTP protocols. The DIAL protocol works without requiring a pairing between devices. DIAL enables what the TV industry calls "second screen" devices, such as tablets, computers and mobile phones to send content to "first screen" devices, such as televisions, Blu-ray players, and STBs.

The DIAL protocol has two components: DIAL Service Discovery and the DIAL REST Service. DIAL Service Discovery enables a DIAL client device to discover DIAL servers on its local network segment and obtain access to the DIAL REST Service on those devices. The DIAL REST Service enables a DIAL client to query, launch, and optionally stop applications on a DIAL server device.

Server DIAL protocol component 208 may be any device or system that is operable to perform server side protocols in accordance with a multiscreen discovery and launch of first screen content specification.

DIAL service discovery component 210 may be any device or system that is operable to enable a DIAL client device to discover DIAL servers on its local network segment and obtain access to the DIAL REST Service on those devices.

DIAL REST service component 212 may be any device or system that is operable to enable a DIAL client to query, launch, and optionally stop applications on a DIAL server device.

As shown in FIG. 2A, at $t_1$, user 118 is watching content 202 that is provided by content provider 102, as shown by circle 204. Then, user 118 decides that he would like to watch content 202 on television 120. To accomplish this, user 118 uses a DIAL application on portable device 124.

As shown in FIG. 2B, at $t_2$, activation of the DIAL application on portable device 124 causes client DIAL protocol component 206 to wirelessly transmit a launch request 216 to server DIAL protocol component 208 in STB 122. Server DIAL protocol component 208 includes a DIAL service discovery component 210 and a DIAL REST service component 212. Launch request 216 is processed by DIAL protocol component 208, which initiates a handshake between portable device 124 and STB 122.

As shown in FIG. 2C, at $t_3$, after the handshake between portable device 124 and STB 122, STB 122 transmits a content request 218 to content provider 102. The content request is compliant with DIAL protocols and identifies portable device 124 and the content 202 which portable device 124 is currently receiving from content provider 102.

As shown in FIG. 2D, at $t_4$, content provider 102 transmits encoded content 220 to STB 122. Encoded content 220 is then decoded by STB 122 and provided to television 120 as content 222, which is displayed as video 224. It should be noted that content 202 in FIG. 2A corresponds to content 222 of FIG. 2D. However, in some cases, content 222 may differ in resolution and display size from that of content 202 to account for display differences between portable device 124 and television 120.

At this point, user 118 is able to watch the content 222 on television 120 as opposed to portable device 124.

There is a problem with prior art DIAL system 100. In particular, a person launching an application on a first screen device, always overrides a previously launched application. This is a problem when more than one user is connected on the same network and tries to use DIAL. For example, where a user is residing in a hotel and is connected to the public network provided by the hotel and is watching cable content launched from his smartphone to play it on the television in the hotel room. The user's DIAL server is now visible to other persons in the hotel, who are connected on the same network. If any other person who is connected on the network launches a program on the television from his portable device, this can disturb the first user as the program which he is watching gets overridden by newly launched program. This will be described in greater detail with reference to FIGS. 3 and 4.

Figure 3:
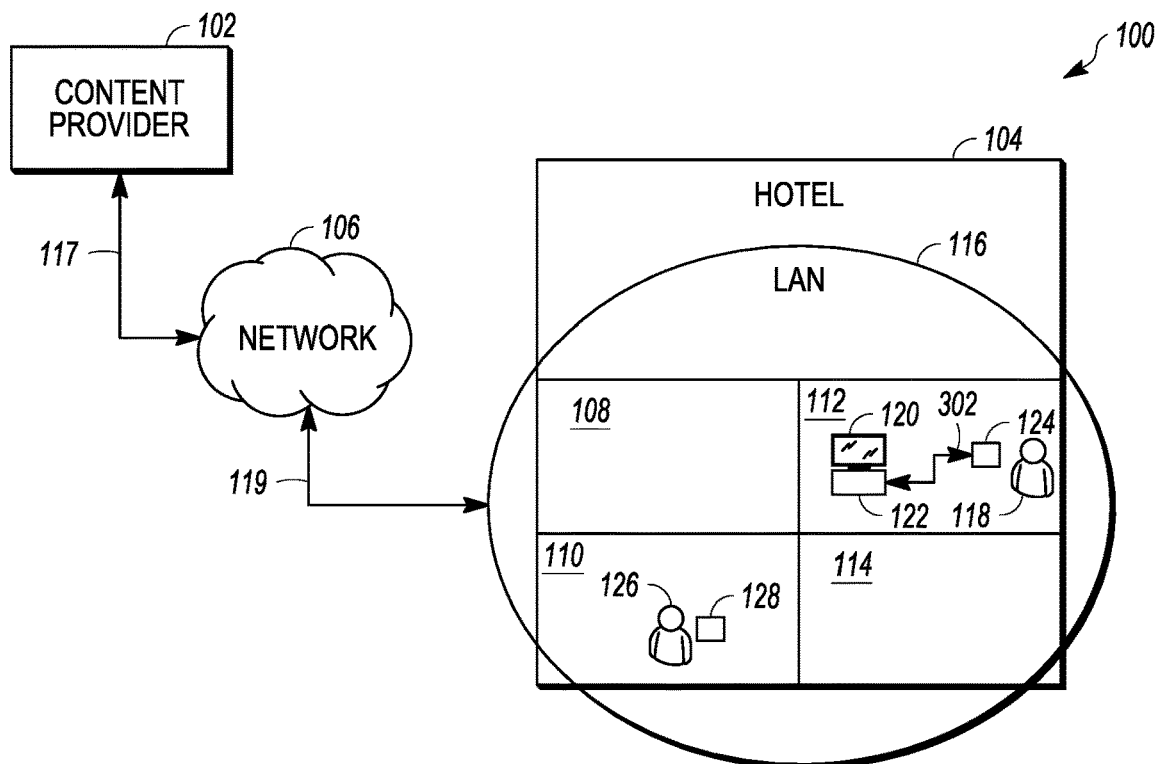
FIG. 3 illustrates a state of operation of the prior art DIAL system of FIG. 1 at the fourth time $t_4$.

FIG. 3 illustrates a state of operation of prior art DIAL system 100 at time $t_4$.

As shown in FIG. 3, user 118 has launched a DIAL process such that content that was initially being watched on portable device 124 is now being watched on television 120. This launched DIAL protocol is illustrated by double arrow 302. However, as mentioned above, user 118 may be interrupted from watching his content on his television 120. This will be described with reference to FIG. 4

Figure 4:
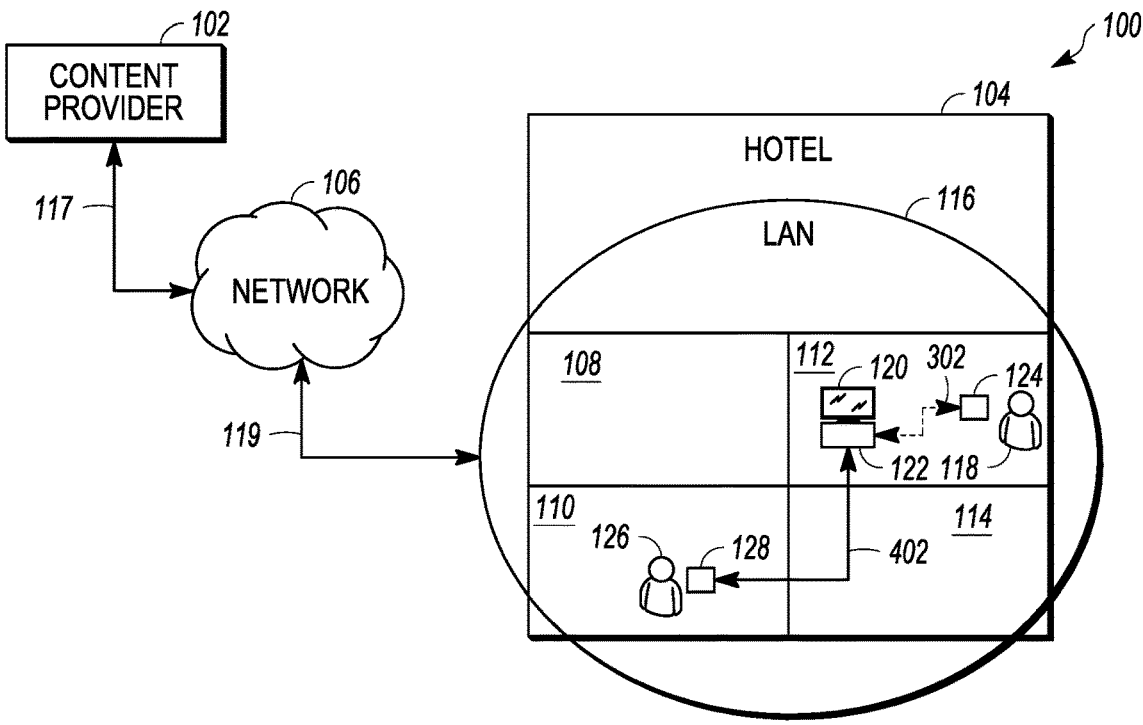
FIG. 4 illustrates a state of operation of the prior art DIAL system of FIG. 1 at a fifth time $t_5$.

FIG. 4 illustrates a state of operation of prior art DIAL system 100 at a time $t_5$.

Consider a situation where user 126 is watching other content on portable device 128. Further, suppose user 126 has scanned the area and has found a DIAL server for which he can watch his content. Accordingly, as shown in FIG. 4, user 128 launches a DIAL process such that content that was initially being watched on portable device 128 will now be viewable on the DIAL server that user 126 has found. Unfortunately, the DIAL server is STB 122 in room 112 of user 118. This launched DIAL protocol from portable device 128 of user 126 effectively disconnects the connection between STB 122 and portable device 124 of user 118. This disconnection is illustrated as dotted double arrow 302. This launched DIAL process from portable device 128 additionally enables the content of user 126 to be viewed by television 120, as is illustrated by double arrow 402.

What is needed is a DIAL system that prevents a user from being disconnected from a display that is displaying his content when another user attempts to connect using a DIAL protocol. Aspects of an embodiment of the present invention solve this problem.

In accordance with aspects of the present invention, in an embodiment, only a user in front of the screen is allowed to launch or override the DIAL application and can therefore block others who are not in front of the screen. This can be achieved by displaying a personal identification code (PIC) on the screen that the user can use to launch the DIAL application.

For launching a DIAL application, a client device is expected to send a HTTP POST request with the desired application. When the DIAL server is enabled with PIC verification, it can generate a PIC and display it on the screen. It can then send a response code back to the client device for PIC verification. This maybe accomplished, for example, by extending existing HTTP response code. In a non-limiting example, a response code may be '707' when PIC verification is needed.

The client device would then be expected to send the PIC as part of application arguments in a HTTP POST request to the DIAL server. The PIC can be in unencrypted format as each time a new random PIC is generated and only a user in front of the screen would be able to enter the PIC while launching an application. The DIAL server can verify the PIC and then launch the application. If PIC verification fails, then an error code can be returned back to client device as part of a HTTP response code. In a non-limiting example, the response code may be '708' when PIC verification fails.

Example response codes are explained in the chart below:

| Application recognized | Message body | Application state | Action |
|---|---|---|---|
| No | any | n/a | 404 Not Found |
| Yes | too long | n/a | 413 Request Entity Too Large |
| Yes | empty | Not running | 201 Created * Start application |
| Yes | non-empty | Not running | 201 Created * Start application with provided argument, if any |
| Yes | empty | Starting$^1$ | 200 OK |
| Yes | non-empty | Starting$^2$ | 200 OK |
| Yes | empty | Running | 200 OK |
| Yes | non-empty | Running | Provide new argument to application |

Example DIAL systems and methods in accordance with aspects of an embodiment of the present invention will now be described with reference to FIGS. 5-12C.

Figure 5:
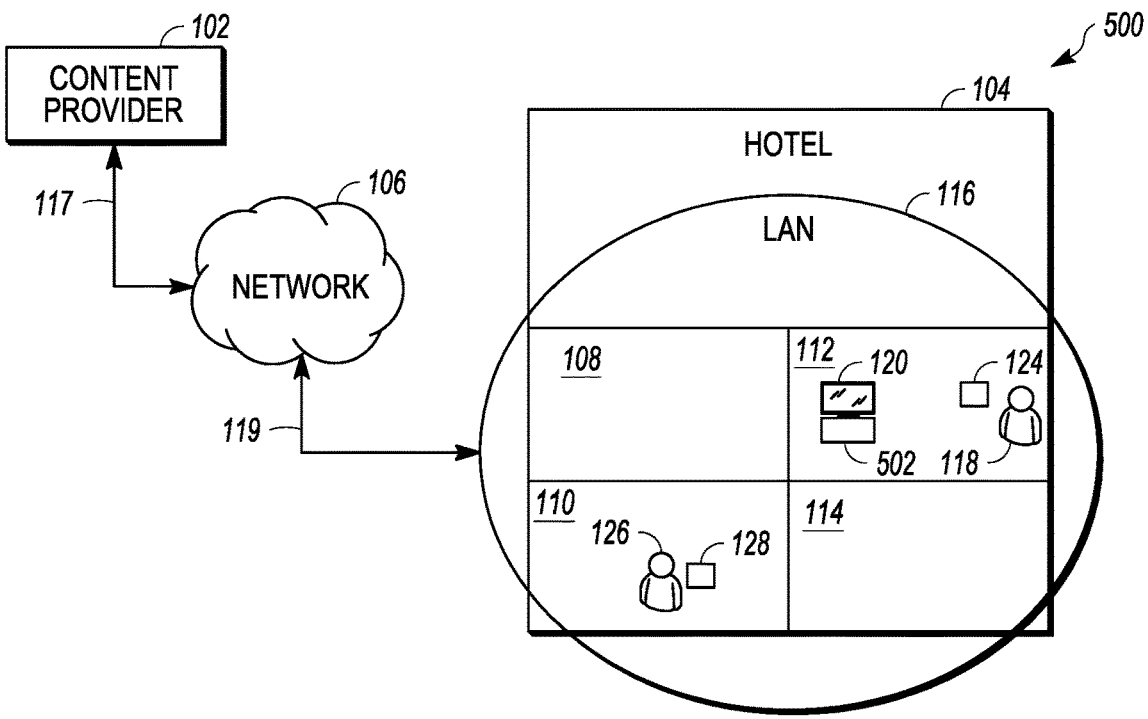
FIG. 5 illustrates an example DIAL system, in accordance with aspects of an embodiment.

FIG. 5 illustrates an example DIAL system 500, in accordance with aspects of an embodiment of the present invention.

As shown in FIG. 5, example DIAL system 500 includes all the elements of prior art DIAL system 100 discussed above with reference to FIG. 1, with the exception that in example DIAL system 500, in room 112, STB 122 has been replaced with an STB 502.

STB 502 may be any device or system that is operable to communicate with content provider 102, receive content from content provider 102 and provide the content to television 120 in accordance with aspects of the present invention as will be described in more detail below; perform, via a DIAL protocol component, protocols in accordance with a multiscreen discovery and launch of first screen content specification; provide, via a video processing component, first video data including PIN image data corresponding to a code so as to display the first video data and a PIN image on a display; and wirelessly receive, via a communication component, a personal identification code from a portable device, generate, via a PIN verification component, a verification signal when the PIC corresponds to the PIN image data, receive, via the communication component, first video content from a content provider and provide, via the video processing component, the first video content to the display based on the verification signal.

Figure 6:
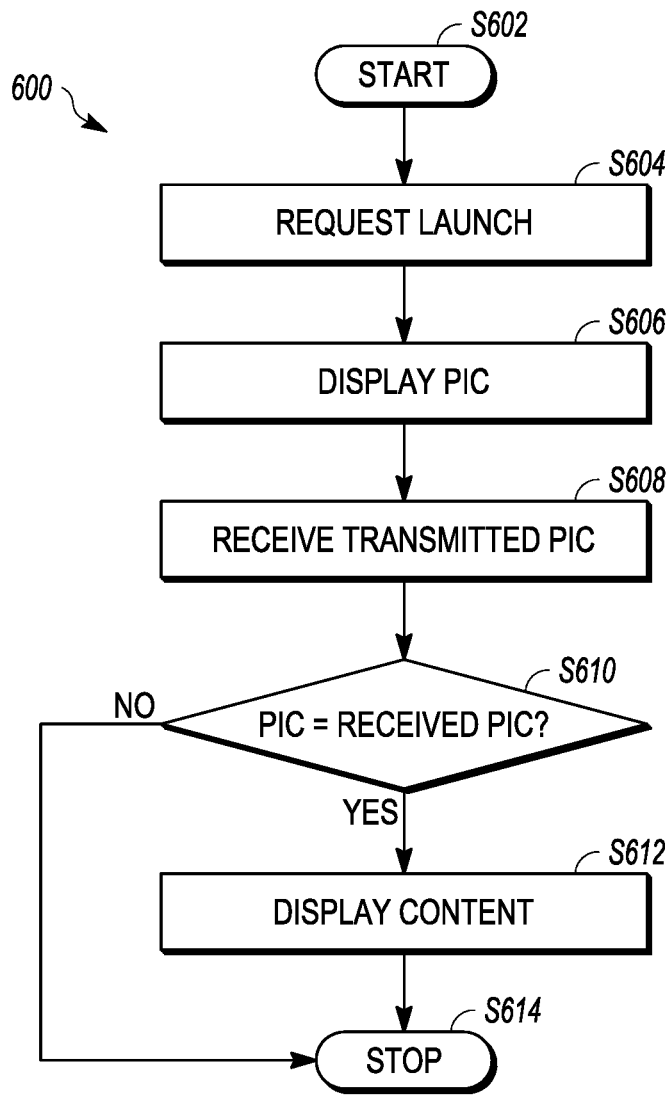
FIG. 6 illustrates an example method for displaying content in accordance with aspects of an embodiment.

FIG. 6 illustrates an example method 600 for displaying content in accordance with aspects of an embodiment of the present invention.

As shown in FIG. 6, method 600 starts (S602) and a request is launched (S604). In an example embodiment, a DIAL protocol component performs protocols in accordance with a multiscreen discovery and launch of first screen content specification. This will be described in greater detail with reference to FIGS. 7A-7D.

Figure 7A:
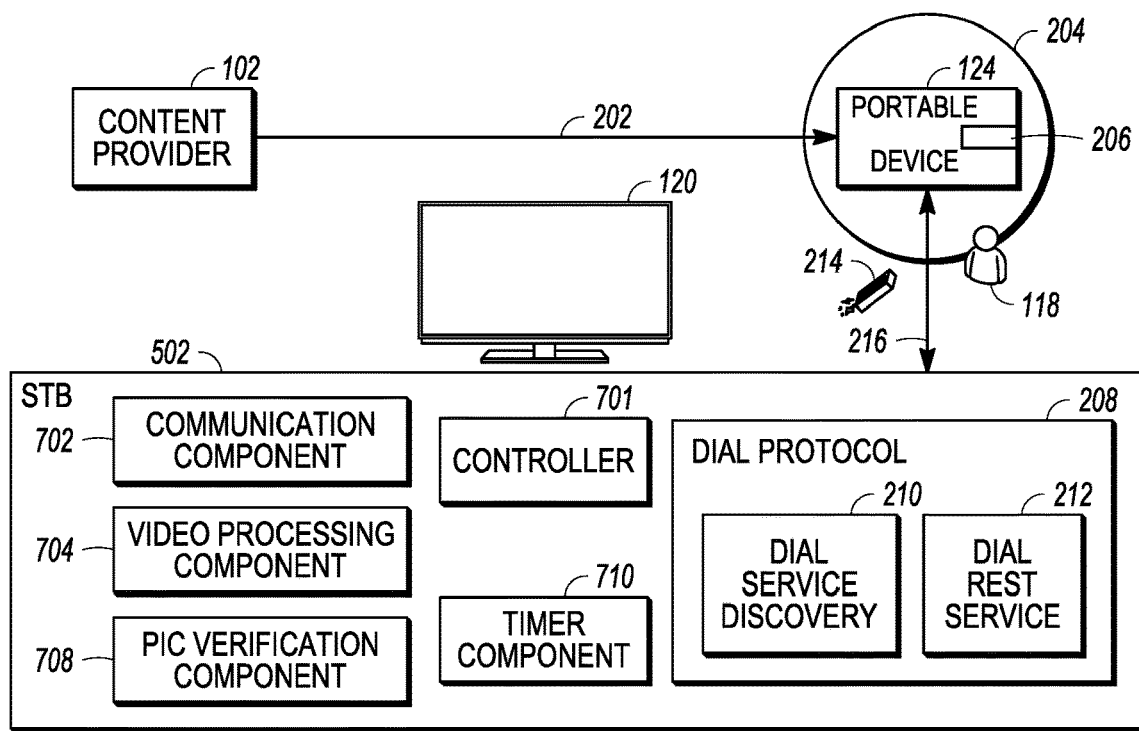
Figure 7B:
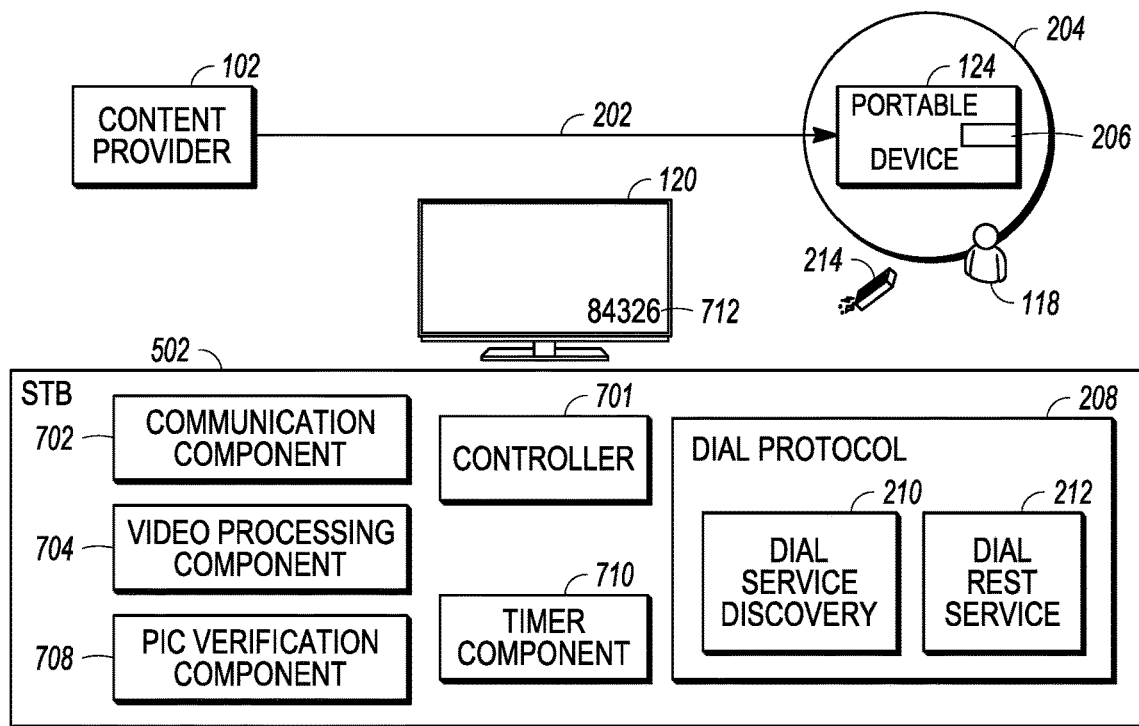
Figure 7C:
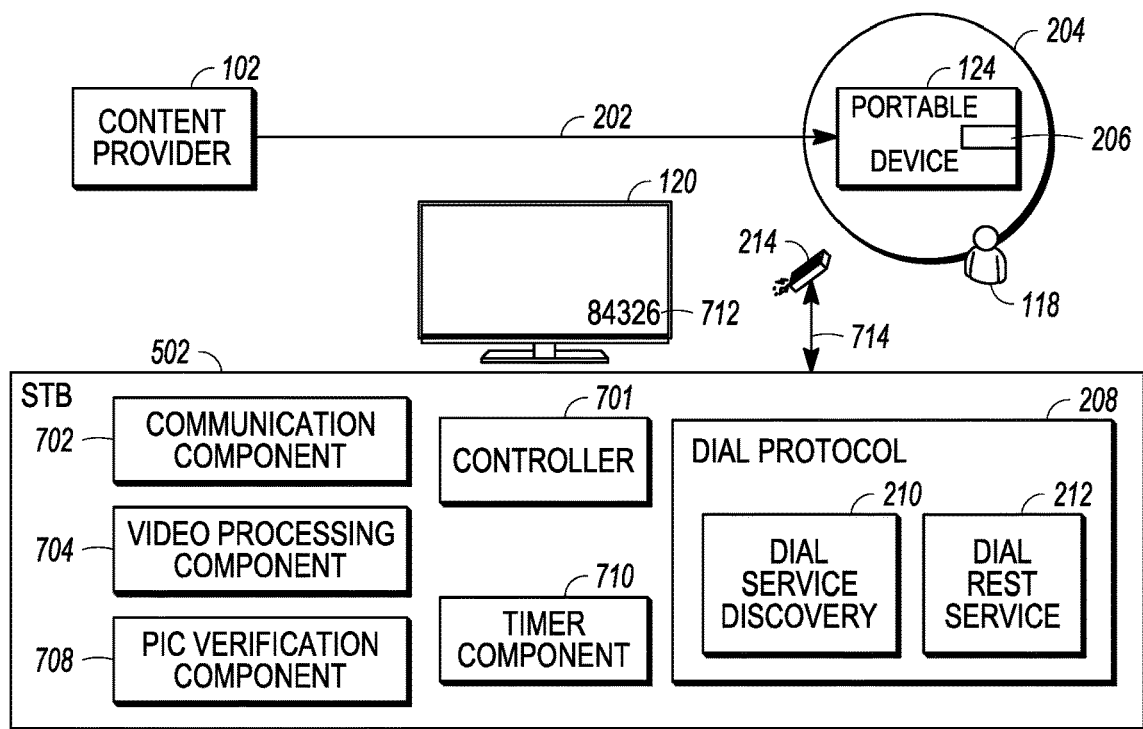
Figure 7D:
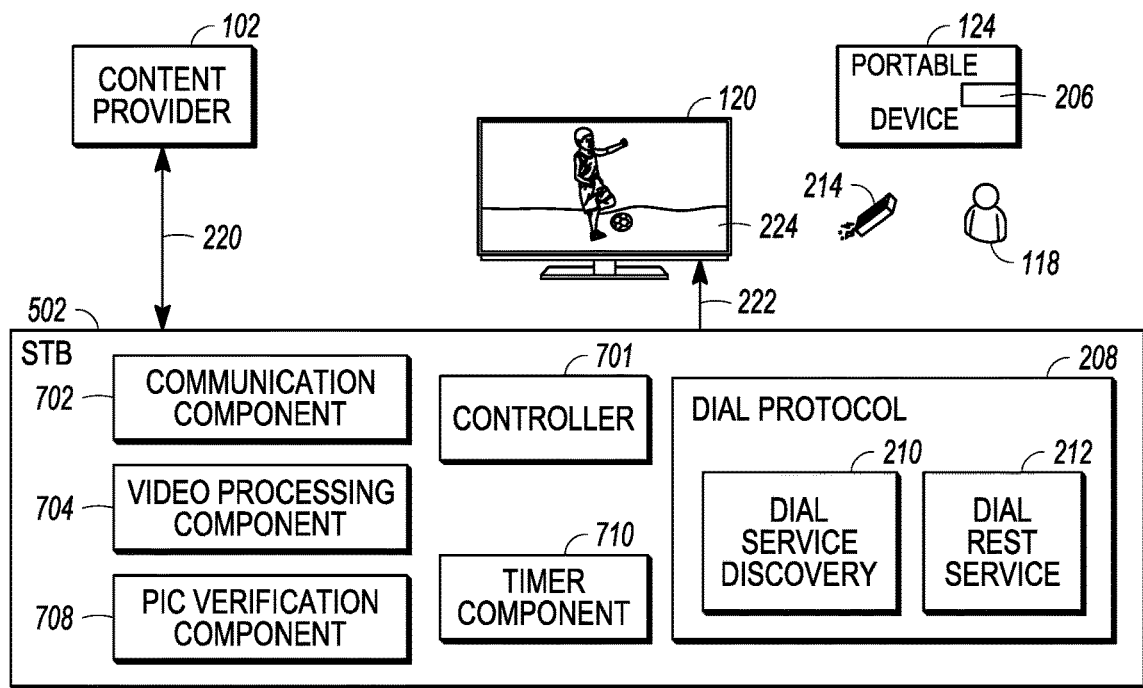

FIGS. 7A-7D illustrate the operation of STB 502 of example DIAL system 500 for displaying content in accordance with aspects of an embodiment of the present invention, wherein FIG. 7A illustrates operation at a first time, $t_a$, FIG. 7B illustrates operation at a second time, $t_b$, FIG. 7C illustrates operation at a third time, $t_c$, and FIG. 7D illustrates operation at a fourth time, $t_d$.

FIG. 7A includes content provider 102, user 118, STB 502, television 120, portable device 124 and remote control 214. Portable device 124 includes client DIAL protocol component 206. STB 502 includes server DIAL protocol component 208, a controller 701, a communication component 702, a video processing component 704, a PIC verification component 708 and a timer component 710. Server DIAL protocol component 208 includes a DIAL service discovery component 210 and a DIAL REST service component 212.

In this example, DIAL protocol component 208, controller 701, communication component 702, video processing component 704, PIC verification component 708 and timer component 710 are illustrated as individual devices. However, in some embodiments, at least two of DIAL protocol component 208, controller 701, communication component 702, video processing component 704, PIC verification component 708 and timer component 710 may be combined as a unitary device. Further, in some embodiments, at least one of DIAL protocol component 208, controller 701, communication component 702, video processing component 704, PIC verification component 708 and timer component 710 may be implemented as a computer having tangible computer-readable media for carrying or having computer-executable instructions or data structures stored thereon.

At least one of portable device 124 and remote control 214 is operable to provide a PIC. Consider a situation in which user 118 is watching content 202 that is provided by content provider 102, as shown by circle 204. Then, user 118 decides that he would like to watch content 202 on television 120. To accomplish this, user 118 launches a DIAL application on portable device 124.

In an example embodiment, activation of the DIAL application on portable device 124 causes client DIAL protocol component 206 to wirelessly transmit a launch request 216 to server DIAL protocol component 208 in STB 502.

Returning to FIG. 6, after the request is launched (S604), a PIC is displayed (S606). In an example embodiment, a video processing component provides first video data including PIC image data corresponding to a code so as to display the first video data and a PIC image on the display.

For example, as shown in FIG. 7B, DIAL protocol component 208 informs controller 701 of receipt of launch request 216.

Controller 701 is arranged to be in communication with DIAL protocol component 208, communication component 702, video processing component 704, PIC verification component 708 and timer 710. Controller 710 may be any device or system that is operable to control operation of DIAL protocol component 208, communication component 702, video processing component 704, PIC verification component 708 and timer 710.

After launch request 216 is received, controller 701 instructs PIC verification component 708 to generate a PIC.

PIC verification component 708 may be any device or system that is operable to generate a PIC, and as described in more detail below; generate a verification signal when the PIC corresponds to the PIC image data; and generate a remaining verification signal when the remaining PIC corresponds to the remaining PIC image data.

The PIC may be any type of code that may be reproduced by a user using a user input of a portable device. Non-limiting examples of PICs include alphanumeric codes, which may include special characters known in to be incorporated into keypads. In some embodiments, the PIC may be predetermined and stored in PIC verification component 708. In some embodiments, the PIC may be generated by PIC verification component 708, which may include known pseudorandom code generation systems and methods.

Controller 701 then instructs PIC verification component 708 to provide the PIC to video processing component 704.

Video processing component 704 may be any device or system that is operable to: provide video data including PIC image data corresponding to a PIC so as to display first video data and a PIC image on television 120; to provide the video content to the television based on a verification signal, as will be described in greater detail below; to provide second video content to the display upon expiration of a predetermined time period, as will be described in greater detail below; to provide second video data including a remaining PIC image data corresponding to a remaining code so as to display the second video data and a remaining PIC image on the display, as will be described in greater detail below; and to continue provide the first video content to the display based on the remaining verification signal upon expiration of the predetermined time period.

Video processing component 704 generates modified video content, which includes any current video content being provided to television 120 in addition to image data corresponding to the PIC. Video processing component 704 then provides the modified video content to communication component 702.

Communication component 702 may be any device or system that is operable to operable to: wirelessly receive the PIC from portable device 124; to communicate with television 120 and to receive video content from content provider 102; to provide a login identification code to the content provider, as will be described in greater detail below; and to receive a display request from a second portable device, as will be described in greater detail below.

After receiving the modified video content from video processing component 704, communication component 702 provides the modified video content to television 120, which displays the modified video content. In this example, there is no current video content being provided to television 120, so the modified video content is merely a white screen with a displayed PIC 712, which reads "84326", for example. It should be noted that if STB 502 were currently providing video content to television 120, then the modified video content would be the currently provided video content with PIC 712 superimposed thereon.

In this non-limiting example, PIC 712 is displayed at the bottom right portion of television 120. However, it should be noted that other example embodiments may display PIC 712 at other locations of television 120.

In this non-limiting example, PIC 712 is an alphanumeric code. However, it should be noted that other example embodiments may create PIC 712 as other code forms, non-limiting examples of which include images, barcodes and QR codes.

Returning to FIG. 6, after the PIC is displayed (S606), a received PIC is received (S608). In an example embodiment, a communication component wirelessly receives the received PIC from the portable device 124.

For example, as shown in FIG. 7C, in a non-limiting example embodiment, user 118 transmits a PIC corresponding to PIC 712 from portable device 124 to STB 502. In another embodiment, user 118 may use remote control 214 to transmit a PIC corresponding to PIC 712 to STB 502. Communication component 702 of STB 502 then receives a received PIC 714 corresponding to PIC 712.

Returning to FIG. 6, after the PIC is received (S608), it is determined whether the displayed PIC is the same as the received PIC (S610). In an example embodiment, a PIC verification component 708 generates a verification signal when the received PIC corresponds to the PIC image data.

For example, as shown in FIG. 7C, PIC verification component 708 compares received PIC 714 with the PIC image data that was provided to television 102 to be displayed as displayed PIC 712.

Returning to FIG. 6, if it is determined that the received PIC is not the same as the displayed PIC (N at S610), then method 600 stops (S614). Accordingly, in this situation, the PIC that is received by STB 502 does not match the displayed PIC, indicating that the person attempting to launch a DIAL protocol cannot view television 120. This would prevent the situation discussed above with reference to FIG. 4.

Returning to FIG. 6, however, if it is determined that the received PIC is the same as the displayed PIC (Y at S610), then content is displayed (S612). In an example embodiment, the communication component receives the first video content from the content provider, and the video processing component provides the first video content to the display based on the verification signal.

For example, as shown in FIG. 7D, communication component 702 of STB 502 contacts content provider 102 and requests the content that is currently being provided to portable device 124. The request from communication component 702 may include identifying information of portable device 124, non-limiting examples of which include the MAC address of portable device 124. With the identifying information in conjunction with the request, content provider 102 then transmits the content to STB 502 as opposed to portable device 124.

Communication component 702 of STB 502 then receives video content 220 from content provider 102. Video processing component 704 then provides the video content to television 120 as content 222, based on the verification signal. Television 120 then displays content 222 as video 224.

Returning to FIG. 6, after the content is displayed (S612), method 600 stops (S614).

In accordance with example method 600 discussed above, a person is able to prevent the situation discussed above with reference to FIG. 4, wherein person 126 is able to essentially kick person 118 off television 120 merely by launching a DIAL protocol from portable device 128. Since only person 118 is in room 112 and therefore only person 118 can view television 120, only person 118 can view displayed PIC on television 120. Therefore, only person 118 will be able to successfully launch a DIAL protocol so that video content from portable device 124 of user 118 can be viewed on television 120.

Another problem with prior art DIAL system 100 of FIG. 1 discussed above deals with content providers that require passwords. In particular, a mismatch in an application login account (Netflix/YouTube) in the first screen device and the second screen device, will cause a failure when the user attempts to play the purchased content on the first screen device. This requires the user to manually switch the account in the first screen device and then play purchased content. For example, consider the situation where a user is watching YouTube/Netflix purchased content on mobile device with login account-1. Then, the user wants to watch it on a TV connected to a set-top, whereas the set-top is currently logged in with account-2. In this case, the user cannot play the content on TV as long as the login accounts are different. The user can only watch the content on the TV after switching the account in the set-top to the one set in the mobile device.

In a second aspect, an embodiment of the present invention solves the password mismatch problem discussed above.

As per DIAL specification: "A DIAL client that wishes to launch an application on a DIAL server SHALL send an HTTP POST request to the Application Resource URL for the desired application. The message body of the POST request MAY be empty or MAY contain an argument string to be passed to the application on launch. How the argument is passed to the application may be platform- and application-specific."

In accordance with an aspect of an embodiment of the present invention, an application login account name used in the client device is passed to the DIAL server as part of application arguments (either encrypted or unencrypted). The DIAL server can then automatically switch to the requested account with a cached login identification code, e.g., a password.

Figure 8:
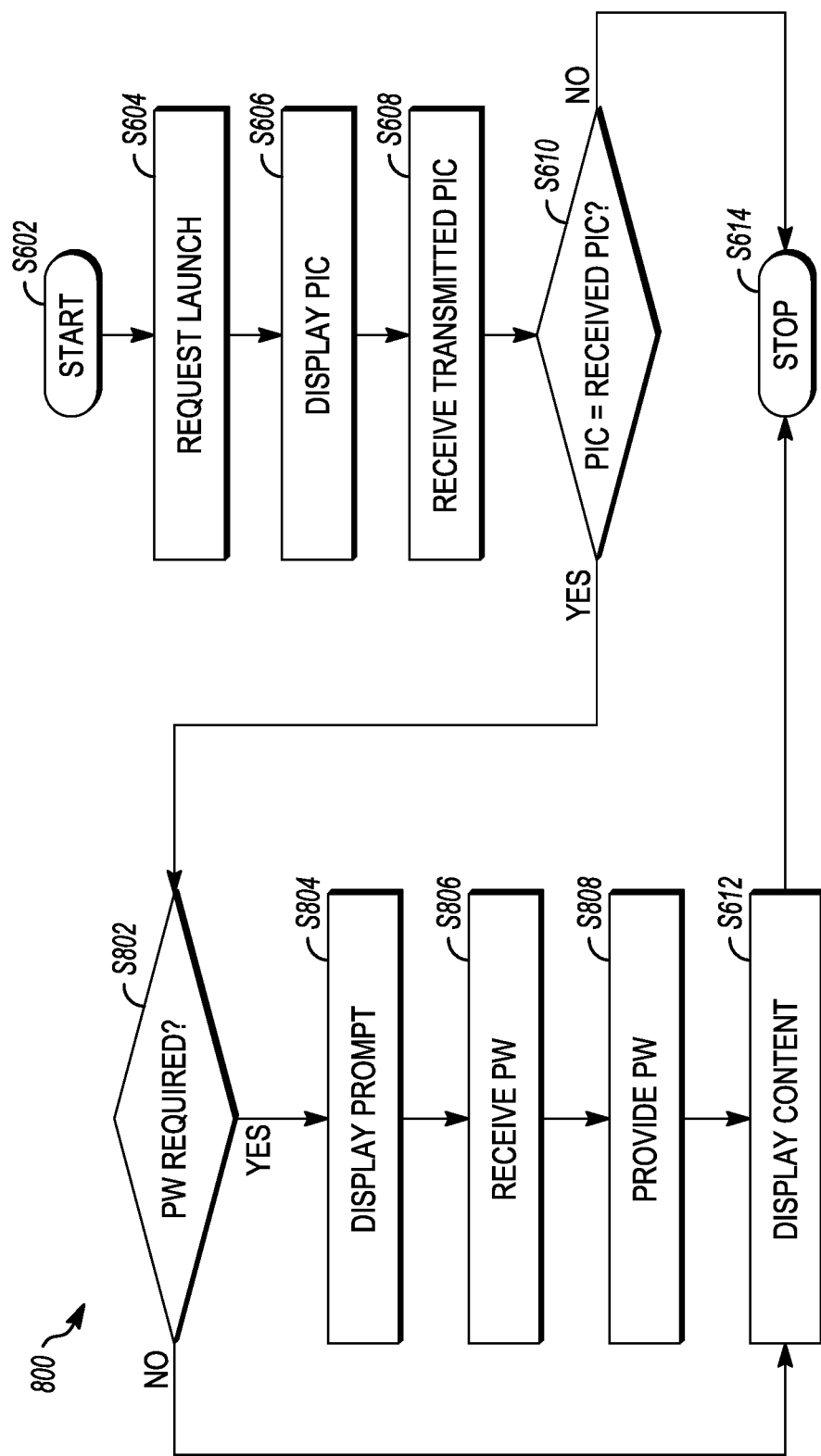

FIG. 8 illustrates an example method 800 for displaying content from a content provider that requires a login identification code in accordance with aspects of an embodiment of the present invention.

Figure 9A:
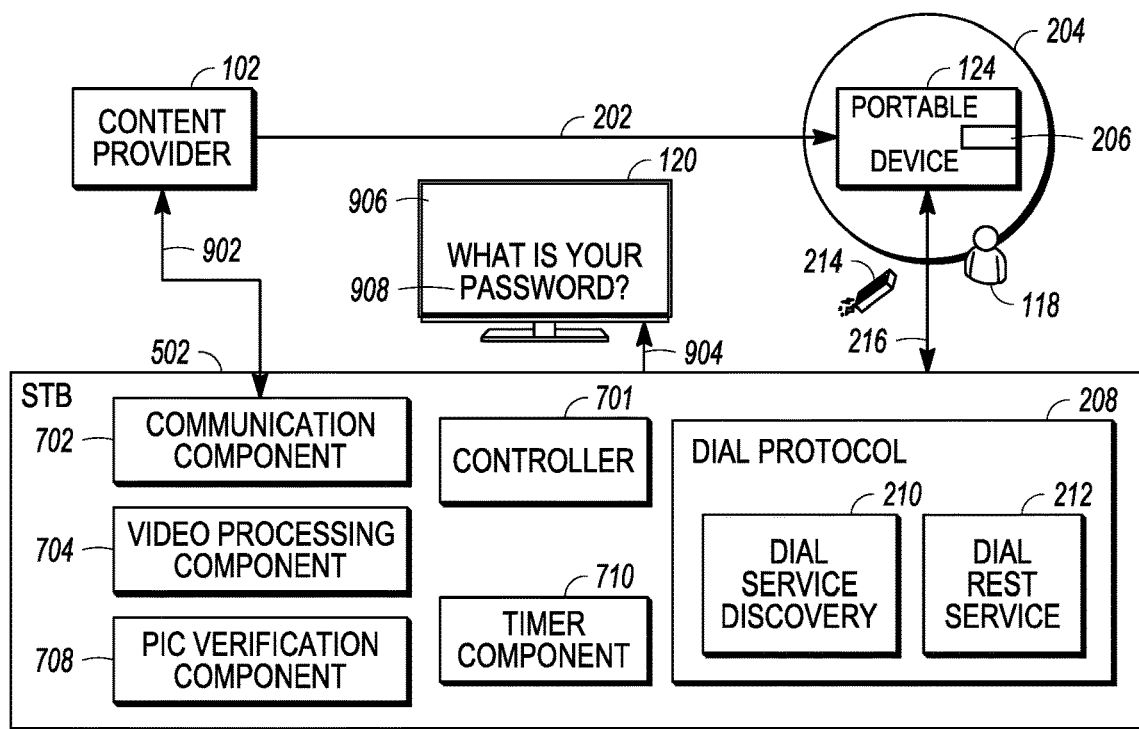
Figure 9B:
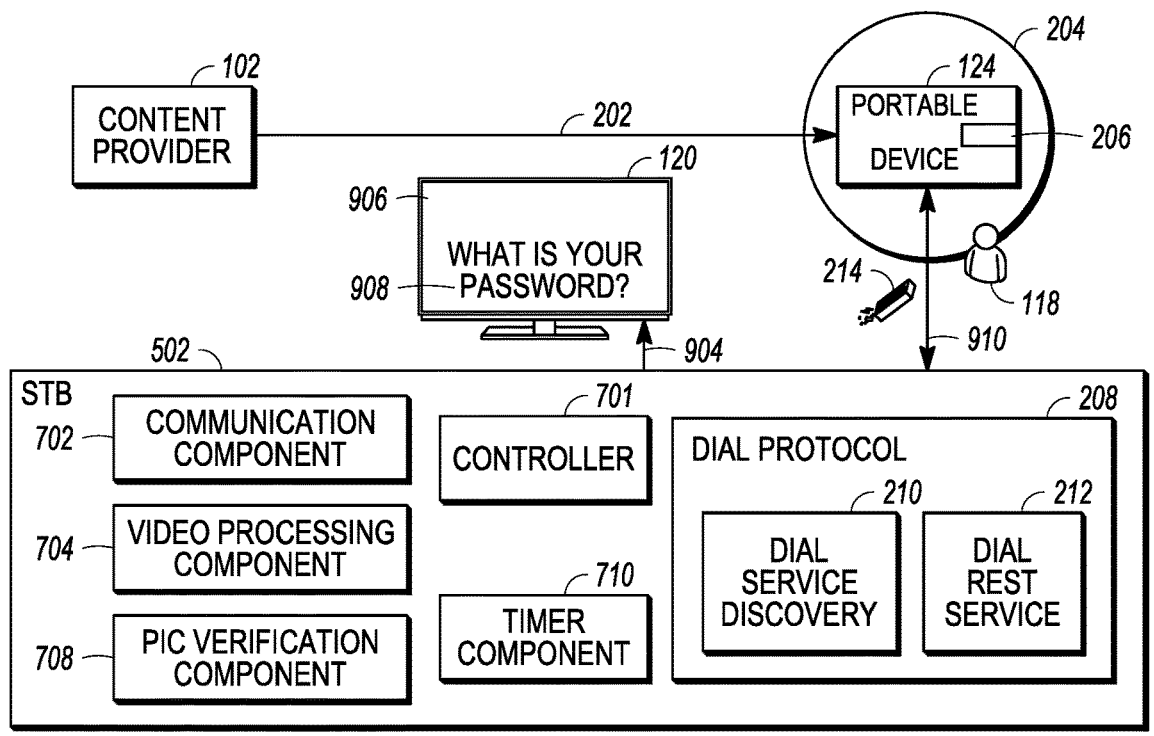
Figure 9C:
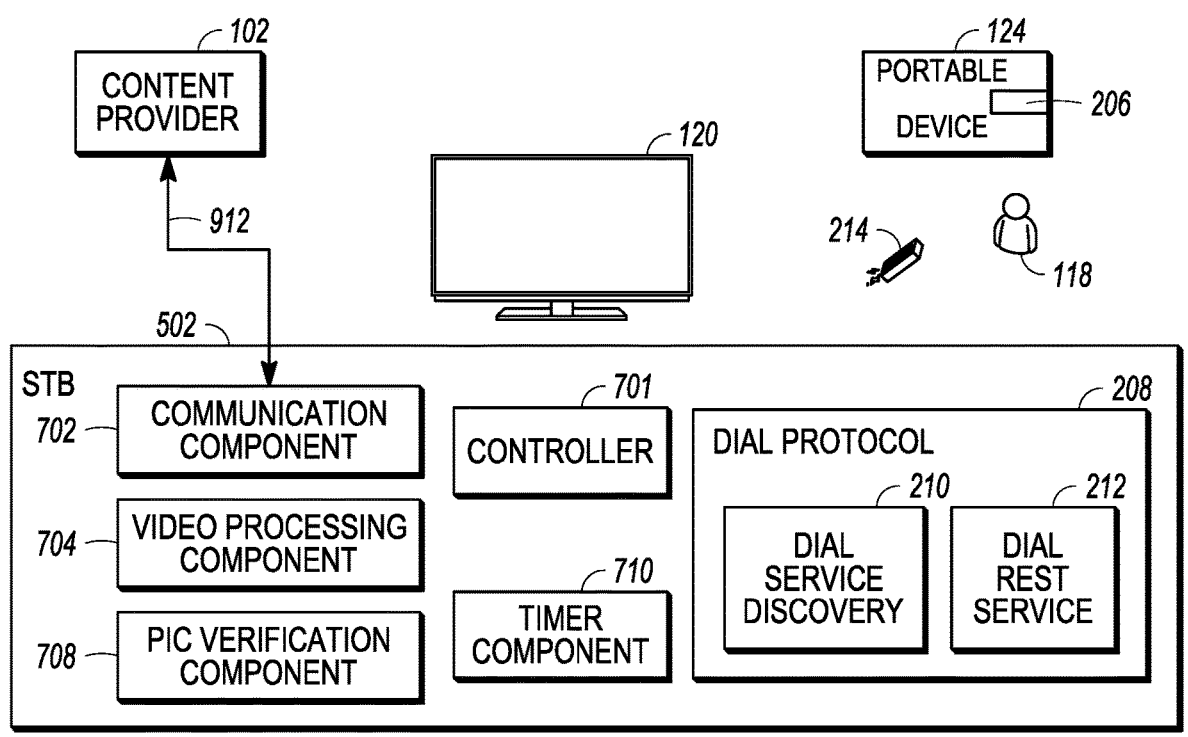

FIGS. 9A-9C illustrate the operation of STB 502 of example DIAL system 500 for displaying content from a content provider that requires a login identification code in accordance with aspects of an embodiment of the present invention, wherein FIG. 9A illustrates operation at a first time, $t_a$, FIG. 9B illustrates operation at a second time, $t_b$, and FIG. 9C illustrates operation at a third time, $t_c$.

FIG. 9A includes content provider 102, user 118, STB 502, television 120, portable device 124 and remote control 214.

As shown in FIG. 8, method 800 is similar to method 600 discussed above with reference to FIG. 6, in that method 800 starts (S602), a request is launched (S604), a PIC is displayed (S606), the PIC is received (S608) and it is determined whether the received PIC is the same as the displayed PIC (S610). These portions of method 800 are performed in a manner similar to the same portions of method 600 discussed above.

If it is determined that the received PIC is not the same as the displayed PIC (N at S610), then method 800 stops (S614). Accordingly, in this situation, the PIC that is received by STB 502 does not match the displayed PIC, indicating that the person attempting to launch a DIAL protocol cannot view television 120. This would prevent the situation discussed above with reference to FIG. 4.

Returning to FIG. 8, if it is determined that the received PIC is the same as the displayed PIC (Y at S610), then it is determined whether a login identification code is required (S802). In an example embodiment, communication component 702 contacts content provider 102, which in turn informs communication component 702 that a login identification code is required.

For example, as shown in FIG. 7D, communication component 702 of STB 502 contacts content provider 102 and requests the content that is currently being provided to portable device 124. The request from communication component 702 may include identifying information of portable device 124, non-limiting examples of which include the MAC address of portable device 124.

However, in this situation for purposes of discussion, presume that the required content requires an additional login identification. For example, let the content be provided from a service of content provider 102, wherein the service requires an additional login identification, e.g., Netflix or Hulu. When trying to display the content on television 120 from content provider 102 in method 600 discussed above (S612), if additional login identification is required, then content provider 102 would not provide the content to STB 502. Accordingly, STB 502 would be unable to compete the DIAL protocol.

To address this issue, in accordance with aspects of an embodiment of the present invention, STB 502 enables user 118 to provide the additional login identification via portable device 124. STB 502 then provides the additional login identification to content provider 102 so that content provider 102 can provide the content to STB 502. STB 502 may then complete the DIAL protocol so that the content may be provided to television 120.

For example, returning to FIG. 9A, user 118 is watching content 202 that is provided by content provider 102, as shown by circle 204. Then, user 118 decides that he would like towatch content 202 on television 120. To accomplish this, user 118 uses a DIAL application on portable device 124. Activation of the DIAL application on portable device 124 causes client DIAL protocol component 206 to wirelessly transmit a launch request 216 to server DIAL protocol component 208 in STB 502. Server DIAL protocol component 208 includes a DIAL service discovery component 210 and a DIAL REST service component 212. Launch request 216 is processed by DIAL protocol component 208, which initiates a handshake between portable device 124 and STB 502.

After the handshake between portable device 124 and STB 502, STB 502 transmits a content request to content provider 102. However, for purposes of discussion, let the content be from a service that requires an additional login identification as discussed above. In this case, the content request is illustrated as a handshake 902 between communication component 702 of STB 502 and content provider 102. Handshake 902 includes the initial content request from STB 502 in addition to the request from content provider 102 for the additional login identification.

If communication component 702 receives handshake 902, as opposed to content provider 102 merely providing the content, then communication component 902 informs PIC verification component 708 of the need for additional login identification required by content provider 102 as indicated in handshake 902.

Returning to FIG. 8, if it is determined that a login identification code is not required (N at S802), then the content is displayed (S612). This is similar to the same portion of method 600 disclosed above.

Returning to FIG. 8, if it is determined that a login identification code is required (Y at S802), then a login identification code prompt is displayed (S804). For example, as shown in FIG. 9A, at this point, communication component 902 has informed PIC verification component 708 of the need for additional login identification required by content provider 102 as indicated in handshake 902.

PIC verification component 708 then instructs video processing component 704 to generate video data 904 including a login identification code request image data and other video data to be displayed on television 120. Video processing component 704 then provides the video data 904 to television 120, which in turn displays a video 906 which includes a video with an image 908 of a request for a login identification code.

In this manner, user 118 can see that in order to view the requested content on television 120 by way of the DIAL protocol, the login identification code of user 118 for the content origin, e.g., Netflix, is required.

Returning to FIG. 8, after the login identification code prompt is displayed (S804), the login identification code is received (S806). For example, as shown in FIG. 9B, in an example embodiment, at time $t_b$, the communication component 702 wirelessly receives the received login identification code 910 from the portable device 124. In other embodiments, the communication component 702 wirelessly receives the received login identification code from the remote control 214.

For example, as shown in FIG. 7C, in a non-limiting example embodiment, user 118 transmits the login identification code 910, corresponding to the login identification code identified in handshake 902 discussed above, from remote control 214 to STB 502. In another embodiment, user 118 may use portable device 124 to transmit a login identification code, corresponding to the login identification code identified in handshake 902 discussed above, to STB 502. Communication component 702 of STB 502 then receives a login identification code, corresponding to the login identification code identified in handshake 902 discussed above.

Returning to FIG. 8, after the login identification code is received (S806), then the login identification code is provided (S808). For example, as shown in FIG. 9C, at time $t_c$, communication component 702 performs another handshake 912 with content provider 102. During handshake 912, communication component 702 provides content provider 102 with the login identification code that was received from user 118, either by portable device 124 or by remote control 214.

Returning to FIG. 8, after the login identification code is provided (S808), then the content is displayed (S612). This action is similar to that discussed above with reference to method 600.

Returning to FIG. 8, after the content is displayed (S612), method 800 stops (S614).

Method 600 discussed above addresses the situation where a person that is not in view of the television is prevented from disconnecting a person that is watching the television off the DIAL protocol. However, there may be situations where more than one person is in view of the television, and further, in which the person that is currently connected to the television using the DIAL protocol may wish to permit one of the other people in view of the television to connect using the DIAL protocol.

Another aspect of an embodiment addresses this situation and will be described in greater detail with reference to FIGS. 10-12C.

Figure 10:
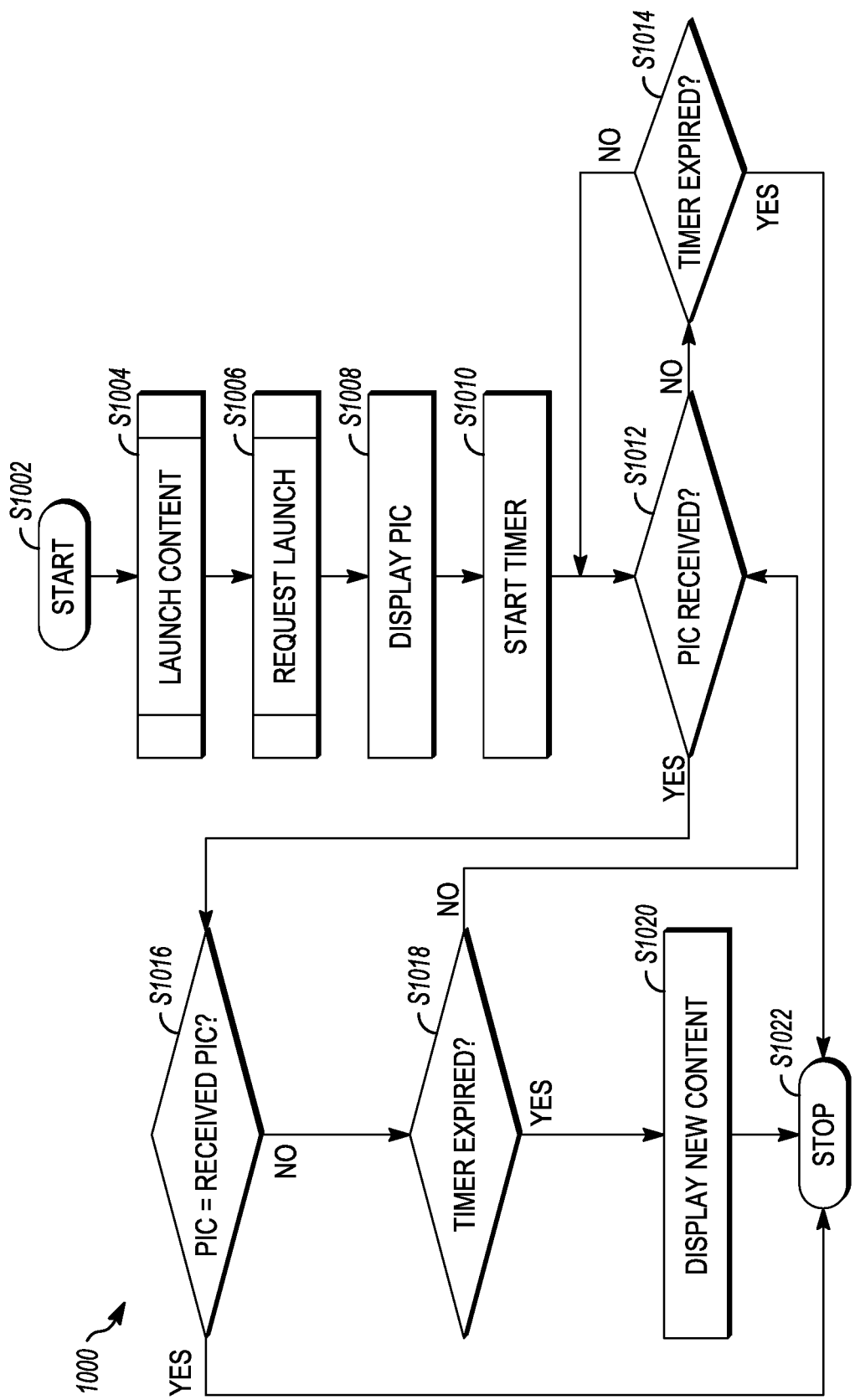
FIG. 10 illustrates an example method for preventing interruption of content or displaying new content in accordance with aspects of an embodiment.

FIG. 10 illustrates an example method 1000 for preventing interruption of content or displaying new content in accordance with aspects of an embodiment.

Figure 11:
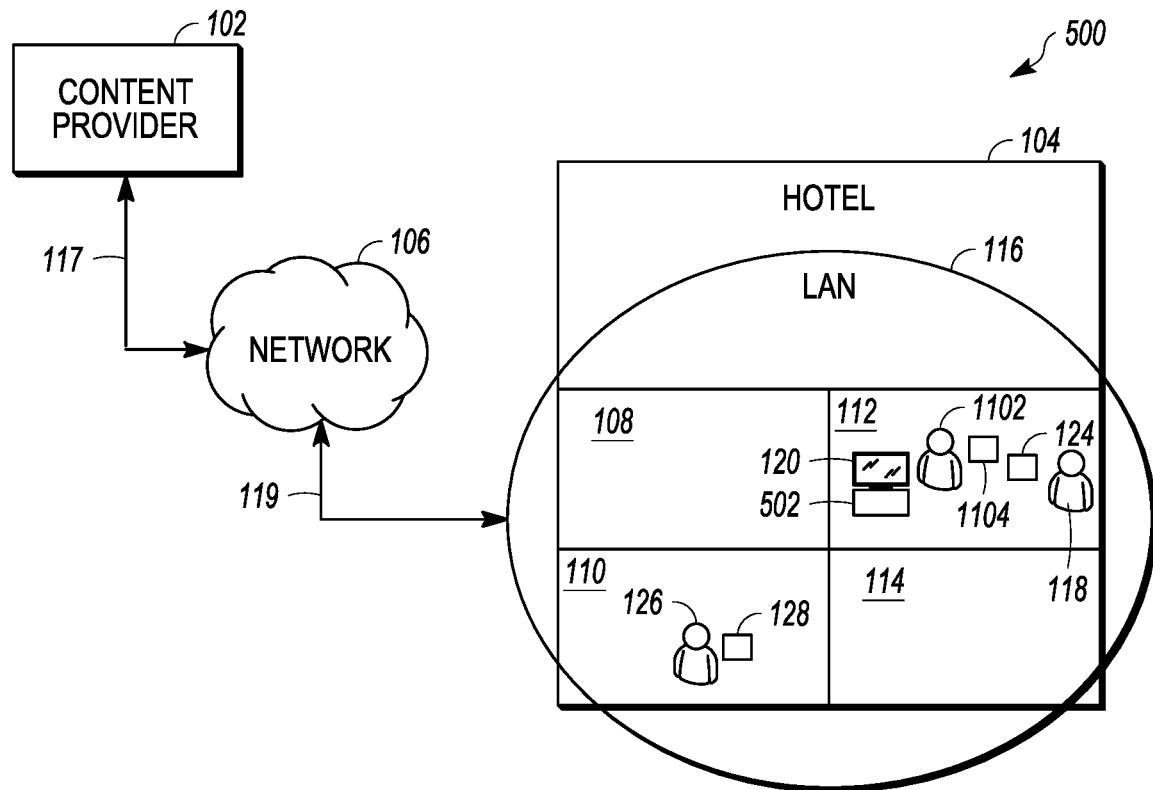

FIG. 11 illustrates example DIAL system 500, but with the addition of an second person in room 112, depicted in a non-limiting example as daughter 1102, wherein daughter 1102 has a portable device 1104. In this illustrative example, daughter 1102 is the daughter of person 118 and is sharing room 112. Accordingly, daughter 1102 can see television 120. Further, in this example portable device 1104 may be similar to each of portable devices 124 and 128. In this light, as will be described in more detail below, portable device 1104 is operable to provide a display request in accordance with the DIAL protocol.

Figure 12A:
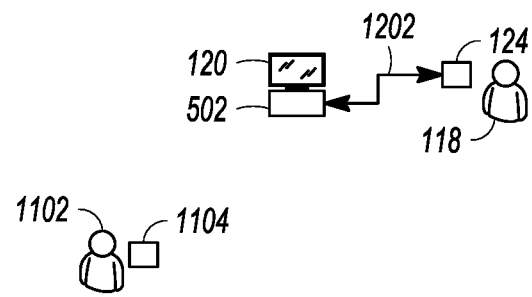
Figure 12B:
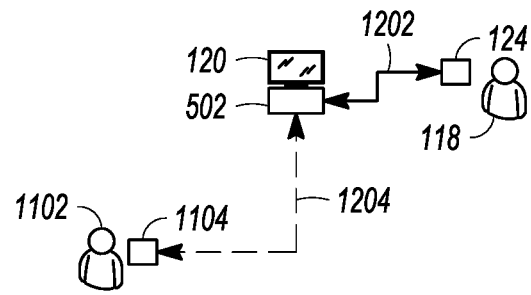
Figure 12C:
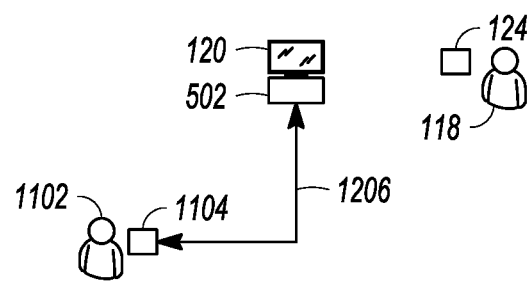

FIGS. 12A-12C illustrate the operation of STB 502 of example DIAL system 500 for preventing interruption of content or displaying new content in accordance with aspects of an embodiment of the present invention, wherein FIG. 12A illustrates operation at a first time, $t_a$, FIG. 12B illustrates operation at a second time, $t_b$, and FIG. 12C illustrates potential operation at a third time, $t_c$.

Returning to FIG. 10, method 1000 starts (S1002) and content is launched (S1004). The content may be launched (S1004) in a manner similar to method 600 discussed above with reference to FIG. 6, or by method 800 discussed above with reference to FIG. 8.

For purposes of discussion, let user 118 complete the DIAL protocol such that the content for which user 118 was watching on portable device 124 is now being displayed on television 120. This is illustrated in FIG. 12A as indicated by double arrow 1202.

Returning to FIG. 11, now consider the situation where user 118 falls asleep in room 112, whereas daughter 1102 is still awake. Further, let daughter 1102 want to watch her own content on television 120. Since it seems that no harm will be done by kicking user 118 off the DIAL connection with STB 502, because user 118 is sleeping, daughter 1102 decides to launch her own request for a DIAL protocol.

Returning to FIG. 10, after the content is launched (S1004), a request is launched (S1006) and then a PIC is displayed (S1008). This is the same as the request being launched (S604) and the PIC being displayed (S606) in method 600 discussed above with reference to FIG. 6.

Returning to FIG. 10, after the PIC is displayed (S1008), a timer is started (S1010). For example, as shown in FIG. 7, timer component 710 may be any device or system that is operable to provide a predetermined time period, wherein the predetermined time period starts based upon receipt, by the communication component 702, of a display request. The display request in this example method is the launch request by portable device 1104 from daughter 1102.

The launch request is illustrated in FIG. 12B as indicated by dashed double arrow 1204. As shown in FIG. 12B, at this point portable device 124 of user 118 is still connected to STB 502 through the DIAL protocol as indicated by double arrow 1202.

While timer component 710 is counting down from the predetermined time period, for example 30 seconds, the PIC is displayed on television 120 in a manner as discussed above with respect to method 600 (S606).

In this example embodiment, the displayed PIC is provided to enable user 118 to continue watching content on television 120. If portable device 124 does not provide a PIC that corresponds to the displayed PIC, the STB 502 considers person 118 to not still be watching television 120. Accordingly, since another person, in this case daughter 1102 wants to use television 120 via a DIAL protocol, this aspect of an embodiment of the present invention will enable daughter 1102 to essentially kick uninvolved user 118 off the system.

Returning to FIG. 10, after the timer is started (S1010) it is determined whether a PIC has been received (S1012). For example, as shown in FIG. 7C, PIC verification component 708 determines whether a PIC has been received.

Returning to FIG. 10, if it is determined that a PIC has not been received (N at S1012), then it is determined whether the timer has expired (S1014). For example, as shown in FIG. 7C, PIC verification component 708 waits for receipt of a PIC until the predetermined time in timer component 710 expires. In an example embodiment, timer component 710 provides an expiration signal to PIC verification component 708 upon expiration of the predetermined time.

Returning to FIG. 10, if it is determined that the timer has expired (Y at S1014), then method 1000 stops (S1022). In such a situation, since no PIC has been received, then it is determined that user 118 does not want to continue watching his content on television 120 via the DIAL protocol, or at the very least is willing to let daughter 1102 watch her content on television 120.

Accordingly, user 118 is disconnected from STB 502 and daughter 1102 is connected through the DIAL protocol. Therefore, daughter 1102 may watch the content that she was previously watching on portable device 1104 on television 120 by way of STB 502 and the DIAL protocol. This is illustrated in FIG. 12C as indicated by double arrow 1206. As shown in FIG. 12C, at this point portable device 124 of user 118 is no longer connected to STB 502 through the DIAL protocol.

Returning to FIG. 10, if it is determined that a PIC has been received (Y at S1012), then it is then determined whether the received PIC is the same as the displayed PIC. This is the same as that of method 600 discussed above with reference to FIG. 6 (S610).

Returning to FIG. 10, if it is determined that the received PIC is the same as the displayed PIC (Y at S1016), then method 1000 stops (S1022). In this situation, user 118 has viewed the displayed PIC, has decided that he wants to continue to watch his content on television 120 and provides a new PIC to STB 502 in a manner similar to method 600 discussed above (S608).

However, if it is determined that the transmitted PIC is not the same as the displayed PIC (N at S1016), then it is determined whether the timer has expired (S1018). This situation may take into account a time when user 118 has viewed the displayed PIC, has decided that he wants to continue to watch his content on television 120 and inadvertently provides an incorrect new PIC to STB 502. In this situation, if time remains on the timing component, user 118 may have an opportunity to send the correct PIC.

Returning to FIG. 10, if it is determined that the timer has not expired (N at S1018), then it is again determined whether a PIC has been received (S1012). This loop (Y at S1012, N at S1016 and S1018) until the timer expires.

However, if it is determined that the timer has expired (Y at S1018), then new content is displayed (S1020). In this situation, user 118 has not provided any, or the correct PIC within the allotted time period. Accordingly, as shown in FIG. 12C, the content of portable device 1104 of daughter 1102 is provided to STB 502 via the DIAL protocol.

Returning to FIG. 10, after the new content is displayed (S1020), then method 1000 stops (S1022).

It should be noted that in some embodiments, logging out from a source of content, for which user 118 is currently logged in, e.g., Netflix, can also be extended by sending a message to portable device 124 of user 118 to logout from television 120 as there is a new connection request from a new user. In this case, user 118 shall enter the randomly generated PIC to NOT logout, which ensures that user 118 is in front of television 120. If the randomly generated PIC is not entered, then user 118 will get logged out automatically after the predetermined time period expires.

If the cached login identification code entry is not available, then the DIAL protocol in accordance with aspects of an embodiment of the present invention may instruct portable device 124 to prompt user 118 to enter the login identification code. If the account detail is invalid, an error can be notified to portable device 124 by extending the HTTP response code documented in the DIAL specification. For example, a response code of '700' may be provided when login details are invalid.

In other embodiments, a client device may issue an HTTP GET to fetch the DIAL server device description in XML, format. Therefore, with an additional entry in the device description about extended capabilities of a DIAL server, such as for example PIC verification and login portability features, the extended capabilities of the DIAL server are enabled. Therefore, a client device is informed of more DIAL server capabilities and hence may provide a verification and login account name as part of an application launch using HTTP POST request.

The foregoing description of various preferred embodiments has been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A device for use with a content provider, a first portable device, and a display, the first portable device being operable to receive first video content from the content provider, the device comprising:
    a communication component operable to wirelessly receive a personal identification code (PIC) for launching a DIAL application from the first portable device or a remote control, to communicate with the display, and to receive the first video content from the content provider;
    a DIAL protocol component operable to perform protocols in accordance with a multi screen discovery and launch of first screen content specification;
    a video processing component operable to provide first video data including PIC image data corresponding to a code so as to display the first video data and a PIC image on the display; and
    a PIC verification component operable to generate a verification signal when the PIC corresponds to the PIC image data,
    wherein the video processing component is further operable to provide the first video content to the display based on the verification signal.

2. The device of claim 1, for use with at least one of the first portable device and the remote control being further operable to provide a login identification code,
    wherein the communication component is further operable to provide the login identification code to the content provider.

3. The device of claim 2, wherein the communication component is further operable to communicate with the content provider to determine whether the first video content is from a service that requires additional login identification,
    wherein the PIC verification component is further operable to instruct the video processing component to generate login identification code request image data so as to display the login identification code request image data on the display, and
    wherein the communication component is further operable to receive the login identification code from the first portable device or the remote control based on the login identification code request image data.

4. The device of claim 1, wherein the PIC verification component is further operable to generate an error code when the personal identification code does not correspond to the PIC image data, and
    wherein the video processing component is further operable to prevent output of the first video content to the display based on the error code.

5. The device of claim 1, for use with a second portable device, the second portable device being operable to receive second video content from the content provider, and to provide a display request in accordance with a DIAL protocol, the device further comprising:
    a timer operable to provide a predetermined time period,
    wherein the communication component is further operable to receive the display request from the second portable device,
    wherein the predetermined time period starts based upon receipt, by the communication component, of the display request, and
    wherein the video processing component is further operable to provide the second video content to the display upon expiration of the predetermined time period.

6. The device of claim 5, for use with the first portable device being further operable to provide a remaining personal identification code,
    wherein the video processing component is further operable to provide second video data including remaining PIC image data corresponding to a remaining code so as to display the second video data and a remaining PIC image on the display,
    wherein the PIC verification component is further operable to generate a remaining verification signal when the remaining personal identification code corresponds to the remaining PIC image data, and
    wherein the video processing component is further operable to continue to provide the first video content to the display based on the remaining verification signal upon expiration of the predetermined time period.

7. A method using a content provider, a first portable device, and a display, the first portable device being operable to receive the first video content from the content provider, the method comprising:
    performing, via a DIAL protocol component, protocols in accordance with a multiscreen discovery and launch of first screen content specification;
    providing, via a video processing component, first video data including PIC image data corresponding to a code so as to display the first video data and a PIC image on the display;
    wirelessly receiving, via a communication component, a personal identification code from the first portable device;
    generating, via a PIC verification component, a verification signal when the personal identification code corresponds to the PIC image data;
    receiving, via the communication component, the first video content from the content provider; and
    providing, via the video processing component, the first video content to the display based on the verification signal.

8. The method of claim 7 of using the first portable device being further operable to provide a login identification code, the method further comprising:
    providing, via the communication component, the login identification code to the content provider.

9. The method of claim 8, the method further comprising:
    communicating, via the communication component, with the content provider to determine whether the first video content is from a service that requires additional login identification;

instructing, via the PIC verification component, the video processing component to generate login identification code request image data so as to display the login identification code request image data on the display; and receiving, via the communication component, the login identification code from the first portable device based on the login identification code request image data.

10. The method of claim 7, the method further comprising:

generating, via the PIC verification component, an error code when the personal identification code does not correspond to the PIC image data; and preventing, via the video processing component, output of the first video content to the display based on the error code.

11. The method of claim 7 of using a second portable device, the second portable device being operable to receive second video content from the content provider and to provide a display request, the method further comprising:

providing, via a timer, a predetermined time period;

receiving, via the communication component, the display request from the second portable device; and providing, via the video processing component, the second video content to the display upon expiration of the predetermined time period, wherein the predetermined time period starts based upon receipt, by the communication component, of the display request.

12. The method of claim 11 of using the first portable device being further operable to provide a remaining personal identification code, the method further comprising:

providing, via the video processing component, second video data including remaining PIC image data corresponding to a remaining code so as to display the second video data and a remaining PIC image on the display;

generating, via the PIC verification component, a remaining verification signal when the remaining personal identification code corresponds to the remaining PIC image data; and continuing to provide, via the video processing component, the first video content to the display based on the remaining verification signal upon expiration of the predetermined time period.

13. A non-transitory, tangible, computer-readable media having computer-readable instructions stored thereon, for use with a computer and being capable of instructing the computer to perform a method of using a content provider, a first portable device, and a display, the first portable device being operable to receive the first video content from the content provider, the method comprising:

performing, via a DIAL protocol component, protocols in accordance with a multiscreen discovery and launch of first screen content specification;

providing, via a video processing component, first video data including PIC image data corresponding to a code so as to display the first video data and a PIC image on the display;

wirelessly receiving, via a communication component, a personal identification code from the first portable device;

generating, via a PIC verification component, a verification signal when the personal identification code corresponds to the PIC image data;

receiving, via the communication component, the first video content from the content provider; and providing, via the video processing component, the first video content to the display based on the verification signal.

14. The non-transitory, tangible, computer-readable media of claim 13, wherein the method of using the first portable device includes using the first portable device being further operable to provide a login identification code and wherein the computer-readable instructions are capable of instructing the computer to perform the method further comprising:

providing, via the communication component, the login identification code to the content provider.

15. The non-transitory, tangible, computer-readable media of claim 14, wherein the computer-readable instructions are capable of instructing the computer to perform the method further comprising:

communicating, via the communication component, with the content provider to determine whether the first video content is from a service that requires additional login identification;

instructing, via the PIC verification component, the video processing component to generate login identification code request image data so as to display the login identification code request image data on the display; and receiving, via the communication component, the login identification code from the first portable device based on the login identification code request image data.

16. The non-transitory, tangible, computer-readable media of claim 13, wherein the computer-readable instructions are capable of instructing the computer to perform the method further comprising:

generating, via the PIC verification component, an error code when the personal identification code does not correspond to the PIC image data; and preventing, via the video processing component, output of the first video content to the display based on the error code.

17. The non-transitory, tangible, computer-readable media of claim 13, wherein the method includes using a second portable device operable to receive second video content from the content provider and to provide a display request, and wherein the computer-readable instructions are capable of instructing the computer to perform the method further comprising:

providing, via a timer, a predetermined time period;

receiving, via the communication component, the display request from the second portable device; and providing, via the video processing component, the second video content to the display upon expiration of the predetermined time period, wherein the predetermined time period starts based upon receipt, by the communication component, of the display request.

18. The non-transitory, tangible, computer-readable media of claim 17, wherein the method includes using the first portable device being further operable to provide a remaining personal identification code and wherein the computer-readable instructions are capable of instructing the computer to perform the method further comprising:

providing, via the video processing component, second video data including remaining PIC image data corresponding to a remaining code so as to display the second video data and a remaining PIC image on the display;

generating, via the PIC verification component, a remaining verification signal when the remaining personal identification code corresponds to the remaining PIC image data; and continuing to provide, via the video processing component, the first video content to the display based on the remaining verification signal upon expiration of the predetermined time period.

* * * * *